UNITED STATES PATENT OFFICE.

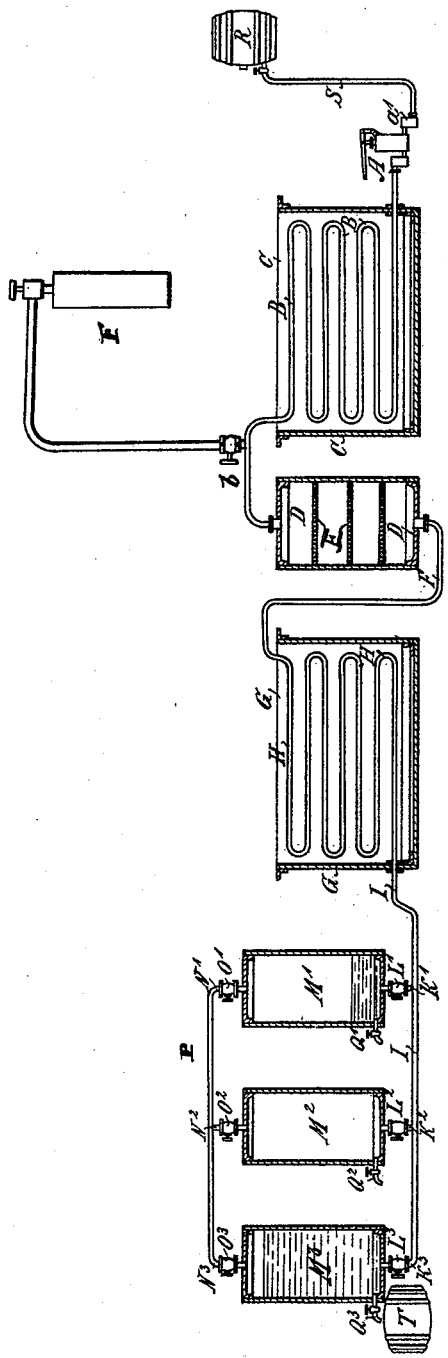

HERMANN KROPFF, OF DUSSELDORF, GERMANY.

PASTEURIZATION OF LIQUIDS.

SPECIFICATION forming part of Letters Patent No. 497,327, dated May 16, 1893.

Application filed July 16, 1890. Serial No. 358,930. (No model.)

*To all whom it may concern:*

Be it known that I, HERMANN KROPFF, machinery-exporter, of 90 Friedrich Street, residing at Dusseldorf-on-the-Rhine, in the Empire of Germany, have invented certain new and useful Improvements in the Pasteurization of Liquids; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

My invention relates to the pasteurization of liquids.

Hitherto the pasteurization of liquids which are liable to become bad has been effected by heating the liquid in a tight vessel to a certain temperature (beer for example being heated to about 140° Fahrenheit or 60° centigrade) and then leaving it to cool in the same vessel. During the heating, gases and steam are generated in quantities varying with the height of the temperature and produce the pressure on the liquid which is essentially necessary for the pasteurization of the same. For example, beer was heated to 140° Fahrenheit the carbonic acid freed from the beer producing a pressure of about five and one-half atmospheres, and the beer was then, as above stated, cooled in the same vessel, thereby only allowing a certain quantity to be pasteurized at a time. It has been found that through the development of the gases and other volatile bodies during the heating process, and the re-absorption of the same during the cooling process the flavor of some liquids is considerably altered.

According to my invention I obviate these objections and carry on the process in a continuous manner by keeping the liquid to be pasteurized under an artificial pressure which is higher than the pressure produced by heating the liquid to the required temperature, and by treating the liquid during the different steps of the pasteurization in different vessels. I can produce the required pressure on the liquid to be pasteurized by the introduction of highly compressed air or that kind of gas which is produced during the heating of the liquid, which in the case of beer is carbonic acid. The liquid thus kept under a high degree of pressure is prevented from evolving gas when being heated, and the composition of the liquid is thereby preserved and the gas is retained in combination. After the liquid has been heated to the proper temperature it is cooled in a suitable cooler, but before the liquid reaches the cooler it is caused to pass through a vessel, D, of greater capacity than either the heater or cooler, consequently of much greater cross-sectional area than that of the circuit pipes as shown, for the purpose of retarding the flow of the beer therethrough, such flow being further retarded by dividing said vessel into a plurality of chambers by means of perforated partitions, E, as shown, the gas by means of which the pressure is kept above that resulting from the expansion of the liquid under the pasteurizing temperature and the tendency to generate steam and gases under said temperature, being forced into the circulation preferably at a point between the heater and said divided vessel, D. The object of passing the hot liquid first through the divided vessel referred to, is not only to retard its flow to the cooler, but to cause the liquid to expand in the increased space and then sink therein in strata, if I may so express myself, down through the several chambers of the vessel, and again enter a contracted passage leading to the cooler. By thus retarding the flow of liquid after it leaves the heater and before it reaches the cooler it is kept at a pasteurizing temperature sufficiently long to insure perfect pasteurization which would not be the case if the liquid were to continuously flow through a conduit of uniform cross-sectional area, as it will be readily understood that in its passage through the said vessel, D, the temperature of the liquid is but slightly reduced, not sufficiently to cause it to fall below a pasteurizing temperature.

That my invention may be fully understood I will proceed to describe how it can be carried into practice by reference to the accompanying drawing, which represents, by way of example, a longitudinal section of an apparatus suitable for the pasteurization of beer according to my invention.

The apparatus consists of a pump, A, to which is connected a coil of pipe or worm, B, contained in a heating vessel, C. Heat may be supplied to the coil by filling the vessel with water and heating the same by means of steam to the proper degree according to the liquid to be pasteurized, in the case of beer to about 60° centigrade. The terminal of the heater coil is connected with a vessel, D, that is subdivided into a number of compartments by means of foraminous partitions, E, as for instance sheet metal partitions provided with numerous small perforations whose function is to retard the flow of beer through vessel, D, so that it may remain exposed for a longer period to the pasteurizing temperature.

From the bottom of vessel, D, a pipe, F, leads into a cooling vessel, G, where it is formed into a worm, H, to which is connected a pipe, I. The latter is fitted with short pipes, $K'$, $K^2$, $K^3$, having cocks or valves, $L'$, $L^2$, $L^3$, and leading to the collecting vessels, $M'$, $M^2$, $M^3$, the covers of which are also provided with short pipes, $N'$, $N^2$, $N^3$, having cocks or valves, $O'$, $O^2$, $O^3$, and all connected to a common pipe, P. The collecting vessels are provided with draw-off cocks, $Q'$, $Q^2$, $Q^3$.

It will be seen that the apparatus as a whole is so arranged as to form a continuous closed circuit from the pump to the receiving vessel, $M'$, $M^2$, and $M^3$, and that by means of the stop cocks, $L'$, $L^2$, $L^3$, $O'$, $O^2$, and $O^3$, any one or two of these vessels may be cut out of the circulation.

The beer to be pasteurized in the cask, R, flows through the pipe S, into the suction valve box, $a'$, of the pump, A. When the valves, $L'$, $L^2$, $L^3$, $O'$, $O^2$, $O^3$, and $Q'$, $Q^2$, $Q^3$, have been shut, highly compressed air or carbonic acid gas produced in any suitable manner, is introduced into the continuous conduit consisting of the worms, B, and H, and the vessel, D, until the pressure exceeds five and one-half atmospheres.

In the pasteurization of liquids containing carbonic acid gas, I prefer, in order to prevent evolution of the gas from the liquid under the action of heat, to employ a similar gas which is preferably admitted to the apparatus at a point between the heater and the pasteurizing or retarding vessel, D, which is also the case when air under pressure is used. The carbonic acid gas may be taken directly from the flask, F, containing liquid carbonic acid and connected with the terminal, $b$, of the heater coil, B, as shown, or the carbonic acid gas may be taken from a reservoir containing the same under pressure, or it may be forced into the apparatus by means of a suitable pump. If air is to be used, the same may also be taken from a reservoir containing the same under pressure, or it may be forced into the apparatus by means of a suitable air pump. The beer pump, A, is then set to work and the worm, B, will thereby be filled with beer. The collecting vessel, $M'$, which first receives, can be placed in connection with the worm, H, from the commencement of the process so as to have the same pressure, or the valve, $L'$, can be opened only while the beer is being pumped into the worm, B, so that the pressure which would otherwise increase is prevented from so doing by the vessel, $M'$, and therefore remains about the same. The beer in the worm, B, is heated to 60° centigrade by means of hot water contained in vessel, C. The pump which is kept working, forces the warm beer through the upper end of worm, B, into the air-tight vessel, D, the capacity of the latter being so calculated that, when the pump is working normally, it would be filled with beer in about twenty minutes, in order to keep the beer for the purpose of thorough pasteurization during that time under the necessary temperature and pressure. In consequence of the high pressure on the beer no gases can form and separate from it, notwithstanding its being heated, and all the carbonic acid therein remains in the beer. The beer is forced (by the continuous working of the pump introducing fresh beer) from the vessel, D, through the pipe, F, into the worm, H, in the cooler, G, where it is cooled down to the initial temperature. The single cooler, G, could be replaced by several coolers placed in a row or superposed. The cool beer then enters the collecting vessel, $M'$. While the latter vessel is being gradually filled, it is, by opening the valves, $O'$ and $O^2$, leading into the pipe, P, brought in connection with the collecting vessel, $M^2$, and the compressed air or carbonic acid which becomes available from the filling of the vessel, $M'$, is allowed to enter the vessel, $M^2$. This causes a saving of the compressed air or carbonic acid.

In the apparatus illustrated in the drawing, the vessel $M^3$, is represented as filled, the beer being drawn off into the cask, T, and the vessel, $M'$, just being filled.

It will be evident from the above description that the operation is continuous, and that the formation of gases from the beer during the pasteurization is prevented.

The arrangement and construction of the separate parts of the apparatus admit of various modifications.

Having thus described my invention, what I claim is—

1. In the pasteurization of liquids, the improvement which consists while the liquid is flowing from a holder to a receiver, in subjecting the liquid to a pasteurizing temperature, causing the liquid to flow through a gaseous atmosphere under sufficient pressure to prevent evolution of gases from the heated liquid, then cooling said liquid before it reaches the receiver.

2. In the pasteurization of beer, the improvement which consists while the beer is flowing from a holder to a receiver, in subjecting the beer to a pasteurizing temperature causing the beer to flow through an atmosphere of carbonic acid gas under sufficient pressure to prevent the evolution of gases from the heated beer, then cooling the same before it reaches the receiver.

3. A pasteurizing apparatus comprising the following elements connected in series to wit: a heater, a cooler, a retarding device for retarding the flow of liquid from the heater to the cooler interposed between them, as a vessel, D, of greater capacity than either the heater or cooler, said vessel being divided into a plurality of chambers by perforated partitions, one or more receivers, and means for supplying a gas under pressure to said devices, for the purpose set forth.

4. A pasteurizing apparatus comprising the following elements connected in series, to wit: a pump, a heater coil, a vessel, as D, divided into a plurality of chambers by means of perforated partitions, a cooler, and one or more receivers, said vessel, D, being of greater capacity than either the heater or cooler, in combination with a source of gas supply connected with said devices at a point between the heater coil and the vessel, said parts being arranged substantially as and for the purpose set forth.

In testimony whereof I affix my signature in presence of two witnesses.

HERMANN KROPFF.

Witnesses:
   A. H. DREICOIED,
   D. J. PARTELLO.